(No Model.)  2 Sheets—Sheet 1.

F. F. LANDIS.
COMPENSATING GEAR FOR ROAD ENGINES.

No. 252,044.  Patented Jan. 10, 1882.

Attest:
Herm. Lauten.
W. C. Henderson.

Inventor:
Frank F. Landis
By H. T. Abbot.
Attorney.

N. PETERS, Photo-Lithographer, Washington, D. C.

(No Model.) 2 Sheets—Sheet 2.
F. F. LANDIS.
COMPENSATING GEAR FOR ROAD ENGINES.

No. 252,044. Patented Jan. 10, 1882.

Attest:
Herm. Lauten.
Jn. Henderson

Inventor:
Frank F. Landis.
By H. F. Abbot.
Attorney.

UNITED STATES PATENT OFFICE.

FRANK F. LANDIS, OF WAYNESBOROUGH, PENNSYLVANIA.

COMPENSATING-GEAR FOR ROAD-ENGINES.

SPECIFICATION forming part of Letters Patent No. 252,044, dated January 10, 1882.

Application filed May 19, 1881. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Compensation-Gears; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification, and in which—

Figure 1:
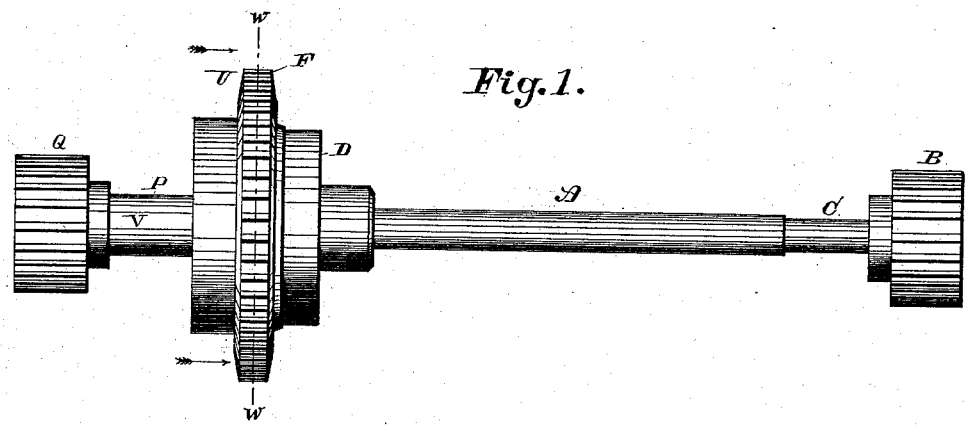
Figure 2:
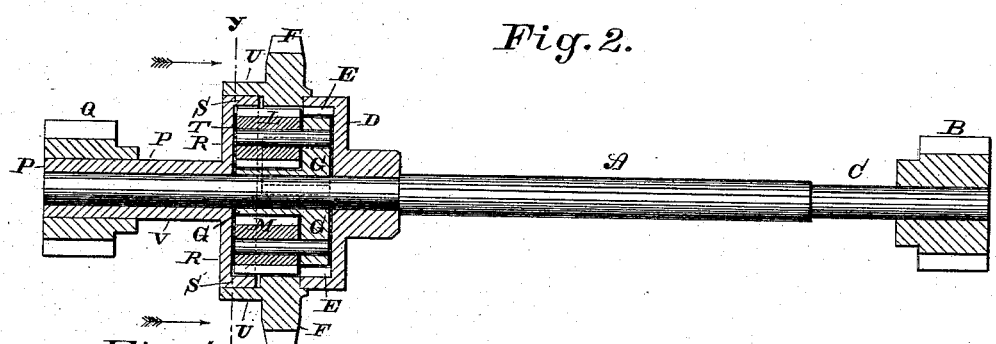
Figure 4:
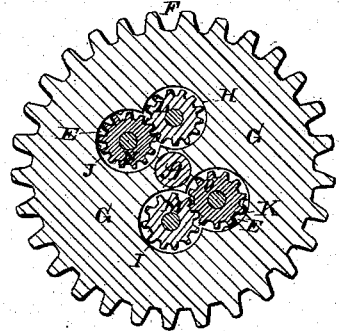
Figure 3:
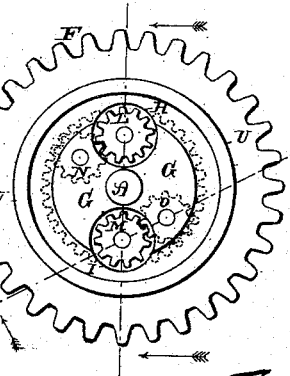
Figure 5:
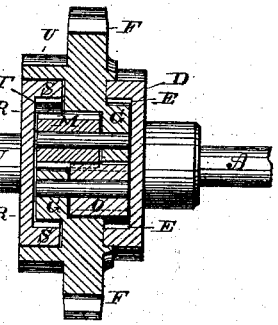
Figure 6:
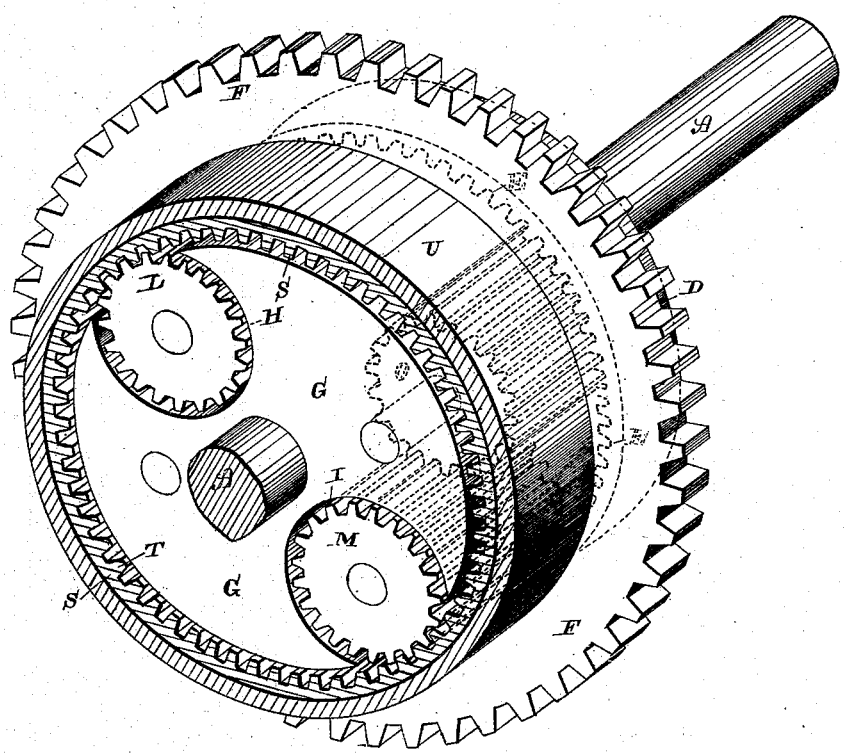
Figure 7:
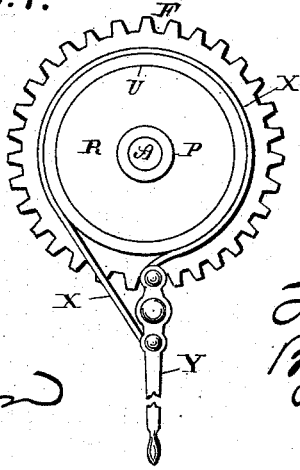

Figure 1 is a side elevation. Fig. 2 is a longitudinal section on the line $x\ x$ of Fig. 3. Fig. 3 is a cross-section on the line $y\ y$ of Fig. 2, with the disk R removed. Fig. 4 is a cross-section on the line $w\ w$ of Fig. 1. Fig. 5 is a section on the line $z\ z$ of Fig. 3. Fig. 6 is an enlarged perspective, with the shaft, sleeve, and disk removed, on the line $y\ y$ of Fig. 2. Fig. 7 is an end view, showing the brake-strap and lever.

My invention has for its object certain improvements in mechanical movements, and relates more particularly to gearing for connecting two shafts or wheels, by which the driving-power is withdrawn from one wheel and concentrated upon another; and it consists in the construction and operation of parts, as will be hereinafter more fully set forth and claimed.

A represents a shaft, having a pinion, B, rigidly attached to one end for engaging with a gear-wheel, and turned down at C for a bearing. The opposite end of this shaft is turned down for a suitable distance, forming a shoulder, against which is driven and rigidly secured an annular flanged disk, D, which is provided with an internal set of cogs, E. Next to the disk D a loose wheel, F, is mounted on the shaft, having a body or case of chambers, G, extending outward a suitable distance on both sides of the wheel, one side passing the flange of the disk D to the face of the disk. The body G is provided with four chambers, H I and J K, two of them entering a suitable distance from each side, for the reception of pinions L M and N O. These pinions are provided with spindles that are seated in the body G at the bottom of the chambers; or the spindles may be dispensed with and the pinions constructed to fit the chambers neatly and have their bearings against the sides of the chambers. The chambers H and K enter from opposite sides of the body G, each extending outside of the periphery of the body at one point a suitable distance to engage other gearing, and are sunk deep enough and sufficiently near the same line to have the lower half of each open into the other and permit the pinions L and N to project into the opposite cavity and mesh each with the other. The pinions are made to fit the cavities snugly enough to prevent lateral play, but to permit a free revolution, and each of the four pinions projects beyond the edge of the body G a suitable distance to mesh with the internal set of cogs of the disks D and R.

The chambers I and J and pinions M and O are constructed and operate in a like manner to those above described.

One or more sets of pinions may be used, as may be desired. Two are preferable for strength and to evenly balance the wheel F.

The end of the shaft is covered by a sleeve, P, revolving freely around the shaft. Upon the outer end of this sleeve is driven and firmly fastened a pinion, Q, that meshes with a gear-wheel; and upon the inner end of the sleeve a disk, R, is secured, that covers the face of the projecting body G, and is provided with an annular flange, S, having an internal gear, T, that passes between the brake-flange U of the spur-wheel F and the projecting part of the body G and engages with the pinions L and M. The intermediate part of the sleeve between the disk and the pinion Q forms a bearing, V, that may be seated in a journal-bearing.

The wheel F is provided with an annular brake-flange, U, that receives the brake-strap X, provided with a pendent lever, Y.

It will be obvious from the foregoing description that the body of the wheel F carries two sets of pinions revolving upon their respective centers and meshing with each other and with the flanged disks D and R, and that this construction, while it locks the wheel to the shaft and sleeve by means of the intermeshing pinions, when power is applied to the wheel, so long as there is an equal resistance to both driving-pinions B and Q, yet as soon as the resistance to one of the driving-pinions becomes greater than is offered to the other the resisted pinion ceases to revolve or lessens its speed, and all the power of the engine is developed upon the opposite driving-pinion. Among other things, this is particularly useful in a road-engine in turning from a right line.

For the purpose of convenient reference I prefer to designate this device as a "compensation-gear."

Having thus described my invention, I claim—

1. A compensation-gear consisting of a shaft provided with a stationary pinion, a wheel carrying intermeshing pinions meshing with two cogged disks, one disk rigidly and the other loosely mounted on said shaft, the loose disk carrying a pinion upon its sleeve, substantially as shown and described.

2. In a compensation-gear, a wheel, F, provided with intermeshing pinions, substantially as shown and described.

3. The shaft A and cogged disk D, in combination with the wheel F, provided with intermeshing pinions, and sleeve P, provided with cogged disk R, substantially as shown and described.

4. In a compensation-gear, intermeshing pinions revolving within chambers within a body loosely mounted upon a shaft, said pinions meshing at their outer ends with gearing, substantially as shown and described.

In testimony whereof I affix my signature in presence of two witnesses.

FRANK F. LANDIS.

Witnesses:
 HERM. LAUTEN,
 JOSEPH FORREST.